H. VAN DOREN.
Bread-Board.

No. 212,334.   Patented Feb. 18, 1879.

WITNESSES
Nat. E. Oliphant
Thos. D. D. Durand

INVENTOR
Henry Van Doren
per Chas. H. Fowler
Attorney

UNITED STATES PATENT OFFICE.

HENRY VAN DOREN, OF SOUTH BRANCH, NEW JERSEY.

IMPROVEMENT IN BREAD-BOARDS.

Specification forming part of Letters Patent No. 212,334, dated February 18, 1879; application filed October 31, 1878.

*To all whom it may concern:*

Be it known that I, HENRY VAN DOREN, of South Branch, in the county of Somerset and State of New Jersey, have invented a new and valuable Improvement in Bread-Boards; and I do hereby declare that the following is a full, clear, and exact description of the construction and operation of the same, reference being had to the annexed drawings, making a part of this specification, and to the letters and figures of reference marked thereon.

Figure 1:
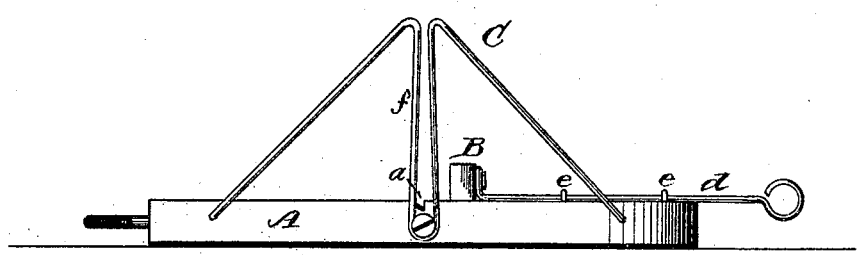
Figure 2:
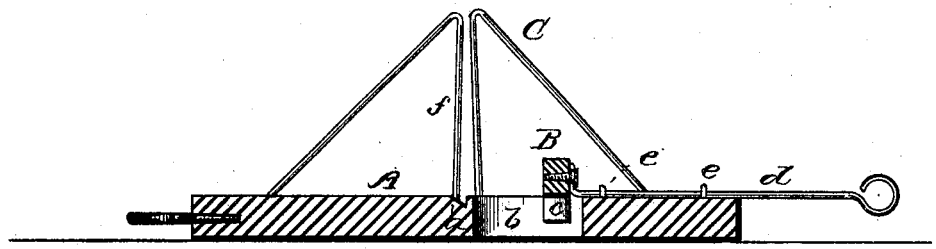

Figure 1 of the drawings is a representation of a side elevation of my invention, and Fig. 2 is a sectional view of the same.

This invention has relation to that class of devices designed for the purpose of cutting bread into slices of uniform thickness by the use of the ordinary hand-knife; and consists in the general construction of the several parts and a certain combination, as will be hereinafter described, and subsequently pointed out in the claims.

In the accompanying drawings, A represents the board or table which supports the loaf to be sliced. Near the center of this board, and running crosswise thereof, is a beveled slot, $a$, the advantages of which are, when the knife is completing the cut, if striking on the bevel, it will, by the inclination thereof, be forced to the bottom of the slot, making a clean cut entirely through the loaf; whereas, were there a smooth surface at the bottom, or too wide a slot, a soft object—such as bread—would be forced to the bottom of the slot, making more or less "sawing" necessary to cut the object entirely off at one single stroke of the knife.

The cross-slot for the reception of the knife in its downward cut is beveled on one of its sides, whereby the cut is greatly facilitated, and at the same time the knife may be pressed sidewise or outwardly to separate the severed or partially-severed slice from the loaf of bread.

The board or table A is formed with a slot, $b$, in which fits the shank or shoulder $c$ of a gage, B, which guides it lengthwise in the slot by the handle $d$, said handle working within eyes or staples $e$. To the sides of the board or table A are secured spring-guides C. These guides are of peculiar construction, being formed of wire and bent downward at their center, and around a bolt, screw, or other projection secured to the sides of the board, and afterward the free ends sprung out and fastened near the ends of the board, forming a spring-guide for the knife.

It will be further noticed that the guides are not composed of two separate wires, but of one single wire, bent at the center, as shown at $f$, and are arranged upon the sides of the board, and lengthwise of the same, and not crosswise, thus leaving the center of the board open and unobstructed to receive any sized loaf or other object to be cut or sliced.

The gage B, as it moves in the slot $b$, has no opportunity to move sidewise or laterally by the pressure of the loaf against it, as the shank of the gage nicely fits within the slot $b$.

Having thus described my invention, what I claim as new, and desire to secure by Letters Patent, is—

1. In a machine for cutting bread or other analogous material, a bed or table, A, provided with an inclined slot, $a$, substantially as described, and for the purpose set forth.

2. The combination of a table, A, having inclined slot $a$, wires C, arranged as shown, and a suitable knife, as and for the purpose set forth.

In testimony that I claim the above I have hereunto subscribed my name in the presence of two witnesses.

HENRY VAN DOREN.

Witnesses:
B. M. POLHEMUS,
C. BERGEN.